No. 861,836. PATENTED JULY 30, 1907.
G. HAVELL.
CORN AND CALLOUS SHAVER.
APPLICATION FILED FEB. 28, 1906.
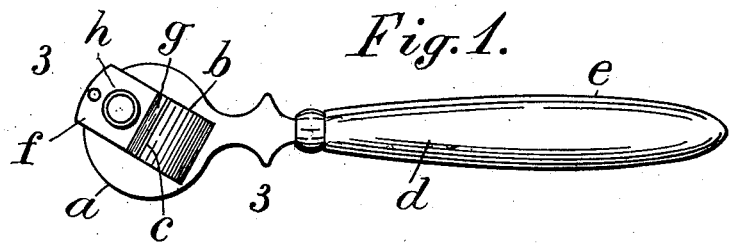
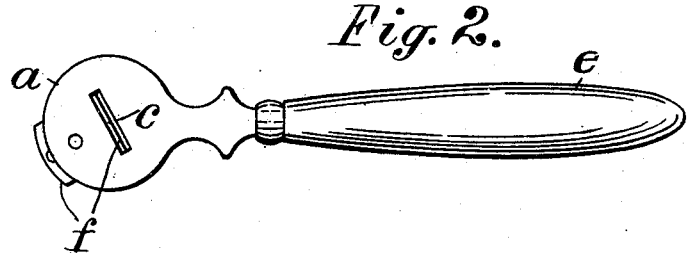
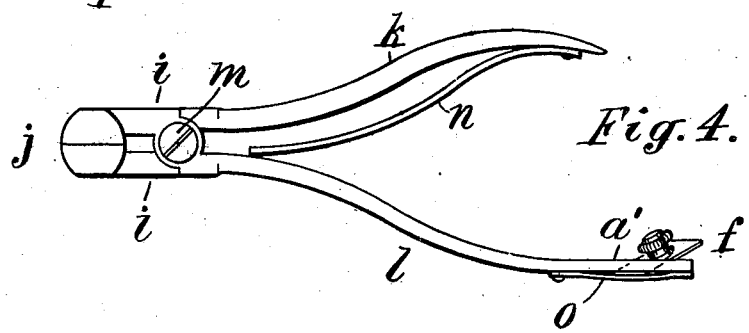
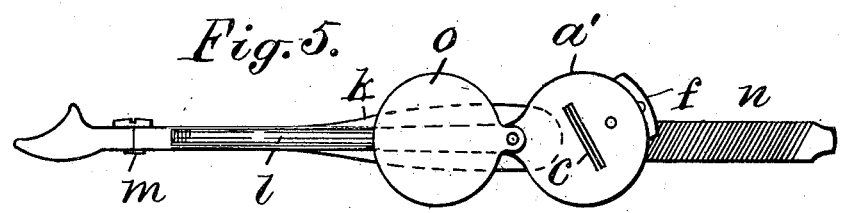
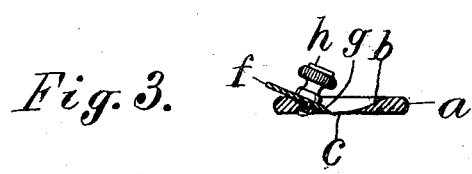

UNITED STATES PATENT OFFICE.

GEORGE HAVELL, OF NEWARK, NEW JERSEY, ASSIGNOR TO HAVELL MANUFACTURING COMPANY, OF NEWARK, NEW JERSEY, A CORPORATION OF NEW JERSEY.

CORN AND CALLOUS SHAVER.

No. 861,836.	Specification of Letters Patent.	Patented July 30, 1907.

Application filed February 28, 1906. Serial No. 303,341.

*To all whom it may concern:*

Be it known that I, GEORGE HAVELL, a citizen of the United States, residing at 30 Mount Prospect Place, Newark, county of Essex, and State of New Jersey, have invented certain new and useful Improvements in Corn and Callous Shavers, fully described and represented in the following specification and the accompanying drawings, forming a part of the same.

The object of this invention is to provide an instrument by which corns, and other callous parts of the skin can be shaved off with ease and safety; and the invention comprises a plate with a recess upon one side and a narrow throat extended from such recess to the other side, a blade secured in the recess and projected slightly from the throat, and a handle attached to one edge of the plate in the plane of the plate upon the side opposite to the blade; so that in the cutting operation the instrument may be pulled and not pushed. The edge of the blade is preferably set oblique to the line of draft so as to produce a draw-cut. The recessed plate carrying the blade may be formed with a tang upon one edge and a handle provided upon the tang, or the plate may be formed upon one of the handles of a jointed nail-clipper, so as to combine the corn-shaver and nail-clipper in a single implement. The spring between the handles of such nail-clipper may be formed with file teeth for smoothing the nails and pivoted to be turned outwardly when in use. A movable cover is also applied to the corn-shaver to conceal its cutting edge when the clipper is not in use.

The invention is shown in Figs. 1 and 2, which show the upper and under sides of the plate with the handle projected from one edge; Fig. 3 is a cross section of the plate and blade, through the center line of the recess $b$ parallel with its opposite edges, the screw $h$ not being in section; Fig. 4 is a side view of the nail-clipper with the corn-shaver attachment; and Fig. 5 is an edge view of the nail-clipper with the corn-shaver arranged in readiness for use, and the spring file extended.

In Figs. 1 to 3 inclusive $a$ designates the plate, $b$ the recess milled therein and formed by the milling cutter with parallel edges and a curved bottom, as shown in Fig. 3, with the throat $c$ extended from the bottom of the recess through the plate to its opposite side. A handle $d$ is shown attached to one edge of the plate in the plane of the plate, at an angle of about 60 degrees with the line of the throat to receive a handle $e$. The throat and recess are thus set obliquely to the axis of the handle and plate. The blade $f$ is shown secured in the end of the recess opposite to that nearest the handle, and provided with beveled edge $g$ upon its upper side, that is the side opposite to the throat; which enables the flat side of the blade to be extended through the throat, as shown in Fig. 3. The blade is shown flat in Fig. 3 and extended across the arch of the curved bottom of the recess, and a screw $h$ inserted through a hole in the blade, which secures it in the recess with the proper projection beyond the throat, to operate smoothly in shaving callous skin. The edge of the blade points toward the handle and sets obliquely thereto, so that the handle is used by drawing the oblique edge of the blade over the skin in shaving the same. Owing to the narrowness of the throat $c$, the slight projection of the cutting edge beyond the bottom of the plate operates to shave the callous skin with entire safety, and the oblique relation of the cutting edge to the handle causes it to shave with great ease and smoothness.

In Figs. 4 and 5, a chiropodist's nail-clipper is shown with jointed jaws $i$ having cutters $j$ thereon, and handles $k$ and $l$ projected backwardly from the pivot $m$. A spring $n$ is shown riveted to the outer end of the handle $k$ and extended against the opposite handle to keep the cutters $j$ normally open. The spring can be turned outwardly, as shown in Fig. 5, and is provided with file teeth for smoothing the nails when thus extended. The handle $l$ is shown provided with a plate $a'$ having the recess $g$ upon its inner side, and having the throat $c$ extended to the outer side, and the blade $f$ fitted in the recess and its edge projected upon the outer side of the plate.

A thin metallic cover $o$ is shown pivoted upon the handle $l$ to be turned over the edge of the blade when it is not in use, and such plate is turned backwardly, as shown in Fig. 5, when it is desired to use the corn-shaver.

The recess and throat are formed to hold the edge of the blade obliquely to the line of the handle $l$ so as to produce a draw-cut, the same as with the arrangement of handle shown in Figs. 1 and 2.

This cutter is analogous in character to a certain class of planes and box-scrapers which have a handle to pull them toward the operator; but it differs from all such constructions in having the handle in the plane of the plate which contains the throat of the blade, and in having the edge of the blade set obliquely to the axis of the handle and thus to the line of draft.

Having thus set forth the nature of the invention what is claimed herein is:

1. A manicure implement, comprising a flat plate having a handle extended from one edge of the plate in the plane of the same, a recess in one side of the plate disposed obliquely to the axis of the plate and handle with a throat extended to the opposite side of the plate, and a blade secured in the recess at the end opposite to the handle obliquely to the axis of the plate and handle and projected slightly through the throat, whereby the cutter may be pulled or drawn toward the operator in using the implement.

2. A manicure implement, comprising the flat plate $a$ having handle $e$ extended from one edge of the plate in the plane of the same, a recess milled in one side of the plate with parallel edges and curved bottom, the edges of the recess $b$ being disposed obliquely to the axis of the plate and handle, and a throat $c$ extended from the bottom of the recess through the plate to its opposite side, and the blade $f$ extended across the curved bottom of the recess opposite to the handle, and secured in the recess with its edge projected through the throat obliquely to the axis of the plate and handle, whereby the cutter may be pulled or drawn toward the operator in using the implement.

3. The combination, with pivoted jaws provided with nail-cutters and handles projected backwardly from the pivot, of a plate formed upon one of the handles and having a recess upon the inner side with throat extended therefrom to the outer side, a blade secured in the recess and projected slightly through the throat upon the outer side, and a movable cover attached to the handle to cover the blade when not in use.

In testimony whereof I have hereunto set my hand in the presence of two subscribing witnesses.

GEORGE HAVELL.

Witnesses:
J. D. CLARK,
THOMAS S. CRANE.